US 6,744,424 B2

(12) United States Patent
Maeda et al.

(10) Patent No.: US 6,744,424 B2
(45) Date of Patent: Jun. 1, 2004

(54) IMAGE FORMING DEVICE

(75) Inventors: Tetsuya Maeda, Osaka (JP); Tetsuya Yoshioka, Osaka (JP); Yoshiyuki Fujiwara, Osaka (JP)

(73) Assignee: Kyocera Mita Corporation, Osaka (JP)

( * ) Notice: Subject to any disclaimer, the term of this patent is extended or adjusted under 35 U.S.C. 154(b) by 313 days.

(21) Appl. No.: 09/963,477

(22) Filed: Sep. 27, 2001

(65) Prior Publication Data

US 2002/0047815 A1 Apr. 25, 2002

(30) Foreign Application Priority Data

Oct. 19, 2000 (JP) ........................................ 2000-319697
Oct. 25, 2000 (JP) ........................................ 2000-325618

(51) Int. Cl.$^7$ ............................................... G09G 5/00
(52) U.S. Cl. ........................................... 345/173; 399/81
(58) Field of Search ........................... 345/173, 174, 345/175, 176, 177, 178, 179; 178/18.01, 18.1; 399/81, 185

(56) References Cited

U.S. PATENT DOCUMENTS

| 4,870,458 | A | * | 9/1989 | Shibuya et al. ............. 399/185 |
| 5,128,672 | A | * | 7/1992 | Kaehler ........................ 341/23 |
| 5,555,104 | A | * | 9/1996 | Todaka ........................ 358/468 |
| 5,950,045 | A | * | 9/1999 | Nomura et al. ................ 399/81 |
| 5,977,954 | A | * | 11/1999 | Arimoto et al. ............. 345/168 |
| 6,225,983 | B1 | * | 5/2001 | Katsurabayashi et al. ... 345/173 |
| 6,421,509 | B1 | * | 7/2002 | Nomura et al. ................ 399/81 |
| 6,567,627 | B2 | * | 5/2003 | Maeda et al. .................. 399/81 |
| 2002/0070925 | A1 | * | 6/2002 | Hashimoto ................... 345/173 |

* cited by examiner

*Primary Examiner*—Xiao Wu
(74) *Attorney, Agent, or Firm*—Smith, Gambrell & Russell, LLP

(57) ABSTRACT

An image forming device according to the present invention includes a display section 2 which can be switched between a first screen and a second screen, and allows the first screen to display functions selected by the user from among a plurality of basic functions. Functions that have not been selected by the user are displayed on the second screen or other screens. By selecting functions that the user often uses, the user can have such frequently used functions always displayed on the first screen. Accordingly, the image forming device allows easy function setting, and therefore is user-friendly.

11 Claims, 14 Drawing Sheets

IMAGE FORMING DEVICE

This application is based on application Nos. 2000-319697 and 2000-325618 filed in Japan, the content of which is incorporated hereinto by reference.

BACKGROUND OF THE INVENTION

1. Field of the Invention

The present invention relates to image forming devices including duplicators, printers, and facsimiles.

2. Description of the Related Art

Recent image forming devices are provided with a great number of functions for image forming operation that can be set according to need. These include functions ranging from those having relatively high frequency of use such as "Density setting" and "Reduction/Enlargement" to those less frequently used such as "Black-white inversion" and "Mirror image", etc.

Meanwhile, buttons for setting those functions are usually provided on the operation panel of the device.

In many cases, recent devices adopt so-called touch-panel type liquid crystal display sections, and the function setting buttons are displayed and operated on the liquid crystal display sections.

Although the display area of the liquid crystal display section is relatively wide, due to the large number of functions to be displayed, displaying all the functions on a single screen is impossible. Or, even when they can be displayed, it is difficult to find out a desired function from among the functions being displayed.

In order to eliminate such drawbacks, some conventional devices have display sections that can be switched among a plural number of screens so that a certain kind of functions are displayed on one screen and another kind of functions are displayed on another screen.

However, in the above way of displaying, since screens and functions displayed on the screens are fixedly related to each other, it causes the user to have difficulty in finding out a screen that includes a function that the user wishes to use.

It is an object of the present invention to provide a user-friendly image forming device that allows the user to easily locate functions that the user wishes to use on the display screen.

BRIEF SUMMARY OF THE INVENTION (1) An image forming device according to the present invention comprises a display section that can be switched at least between a first screen and a second screen, and is capable of displaying functions selected by function selecting means from among a plurality of functions on the first screen.

In this arrangement, functions selected by the user are displayed on the first screen, and functions that are not selected are displayed on other screens such as the second screen. Accordingly, by selecting functions that the user frequently uses, the user can have the selected, frequently used functions always displayed on the first screen. The image forming device therefore allows easy function setting and is easy to use.

In addition, functions that are not selected by the user are to be displayed on other screens such as the second screen. Accordingly, when the user wishes to set a function that the user has not selected, he or she can switch the screen to another screen such as the second screen.

The plurality of functions mentioned above may be divided into a plurality of predetermined basic functions that are frequently used and functions other than those basic functions so that functions selected from among the basic functions are displayed on the first screen and functions in the basic functions that are not selected are displayed on the second screen. In this arrangement, all functions displayed on the first screen and the second screen are the basic functions. Functions selected from among the basic functions by the user are displayed on the first screen, and functions in the basic functions that are not selected by the user are displayed on the second screen. Accordingly, when usual image forming is carried out, the user can have the first screen displayed so as to set necessary basic functions. When the user wants to set basic functions that are less frequently used than the selected basic functions, the user can have the second screen displayed. Accordingly, the user can set necessary functions only by having the first screen or the second screen displayed.

When increasing functions displayed on the second screen is desired, it can be achieved by making the second screen additionally display functions other than the basic functions, which provides the image forming device with better operationality.

In addition, when unusual usage or special setting is desired, it is possible to make a third screen display functions for such purposes so that the user can set necessary functions on the third screen.

As described so far, according to the present invention, functions to be set for image forming operation are displayed in an easily understandable manner, as well as displayed on the first screen or the second screen according to the user's preference. It is therefore possible to provide a user-friendly image forming device with good operationality.

(2) An image forming device according to another aspect of the present invention comprises a display section that can be switched at least between a first screen and a second screen, and function execution counting means for counting the number of times each of the plurality of functions is executed along with execution of the image forming operation, in which, based on the count of each of the functions counted by the function execution counting means, frequently used functions are displayed on the first screen and functions that have not been selected for the first screen are displayed on other screens such as the second screen.

Frequently used functions may change variously depending on the environment in which the device is used. In other words, a function that is frequently used in an environment is not necessarily used as often in another environment.

In the present invention, with the above factor taken into account, counting is carried out in order to determine which function is used how many times in the environment where the image forming device is used so that frequently used functions are automatically displayed on the first screen based on the results of the counting. That is, the image forming device according to this invention has a learning function so that frequently used functions are always displayed on the first screen irrespective of the environment in which the device is used. Accordingly, the image forming device according to this invention allows easy setting of functions in various environments and is therefore user-friendly.

The plurality of functions above may be divided into predetermined, frequently used basic functions and other functions, and the function execution counting means may be of the kind that counts the number of times the basic functions are executed. By limiting functions possible to be displayed on the first screen to the basic functions, confusion due to various changes in displayed functions on the first screen can be prevented. Generally, while using an image forming device for a long time, the user learns which function is displayed in which part of the display section. Accordingly, varying the functions displayed on the screen according to the frequency of use does not necessarily improve the operationality. By giving such a limit to the functions possible to be displayed on the first screen, the operationality of the image forming device is often improved.

The display control means mentioned above may be arranged such that on condition that the count of a function counted by the function execution counting means exceeds a prescribed minimum count, the function is determined to be frequently used and is displayed on the first screen, and functions that are not selected for the first screen are displayed on the second screen or screens thereafter. This is because there may be cases where the counts are small such as when it is shortly after the purchase of the image forming device, and in such cases, the locations of the functions displayed on the screen frequently change making the operation even harder.

The function execution counting means may be arranged so as to reset the counts after the frequently used functions are displayed on the first screen by the display control means. Unless they are reset, the values of the counters simply keep increasing so that the functions are unlikely to be rearranged according to the most recent record of usage.

(3) An image forming device according to another aspect of this invention includes a direct set-value designating button provided on the screen for directly designating a set value which is preliminarily allocated to a specific setting item of a specific function, in which the number of times the image forming operation has been executed with a set value being designated is counted in conjunction with the set value so that the set value to be allocated to the direct set-value designating button is varied based on the number of times counted with the set value above being designated.

Since this direct set-value designating button is always displayed, for example, on the first screen in the plurality of selectable screens, a specific set value can be directly designated without opening the condition setting screen for that function.

However, regarding the condition setting for each function, it is not always the case that a set value (a certain magnification in Reduction/Enlargement) frequently used in an environment is used as often in another environment.

Therefore, which set value is designated how many times in the environment where the image forming device is used is counted individually. Based on the results of the counting, set value control means can allocate a frequently designated set value to the direct set-value designating button. That is, the device can learn which set value is frequently used in which environment so that a frequently used set value is always allocated to the direct set-value designating button.

The set value control means should preferably vary the set value to be allocated to the direct set-value designating button on condition that the count value counted by the set value designation counting means exceeds a prescribed minimum count. This is because there may be cases where the counts are small such as when it is shortly after the purchase of the image forming device, and in such cases, the allocation of the set value changes so frequently that the operation becomes even harder.

The set-value designation counting means should preferably reset the counts after the set value to be allocated to the direct set-value designating button is varied by the set value control means. This is because unless they are reset, the values of the counters simply keep increasing, which makes it impossible to allocate a set value reflecting the most recent record of usage.

Structural details of the present invention are hereinafter described referring to the appended drawings.

DETAILED DESCRIPTION OF THE INVENTION

1. First Embodiment

Figure 1:
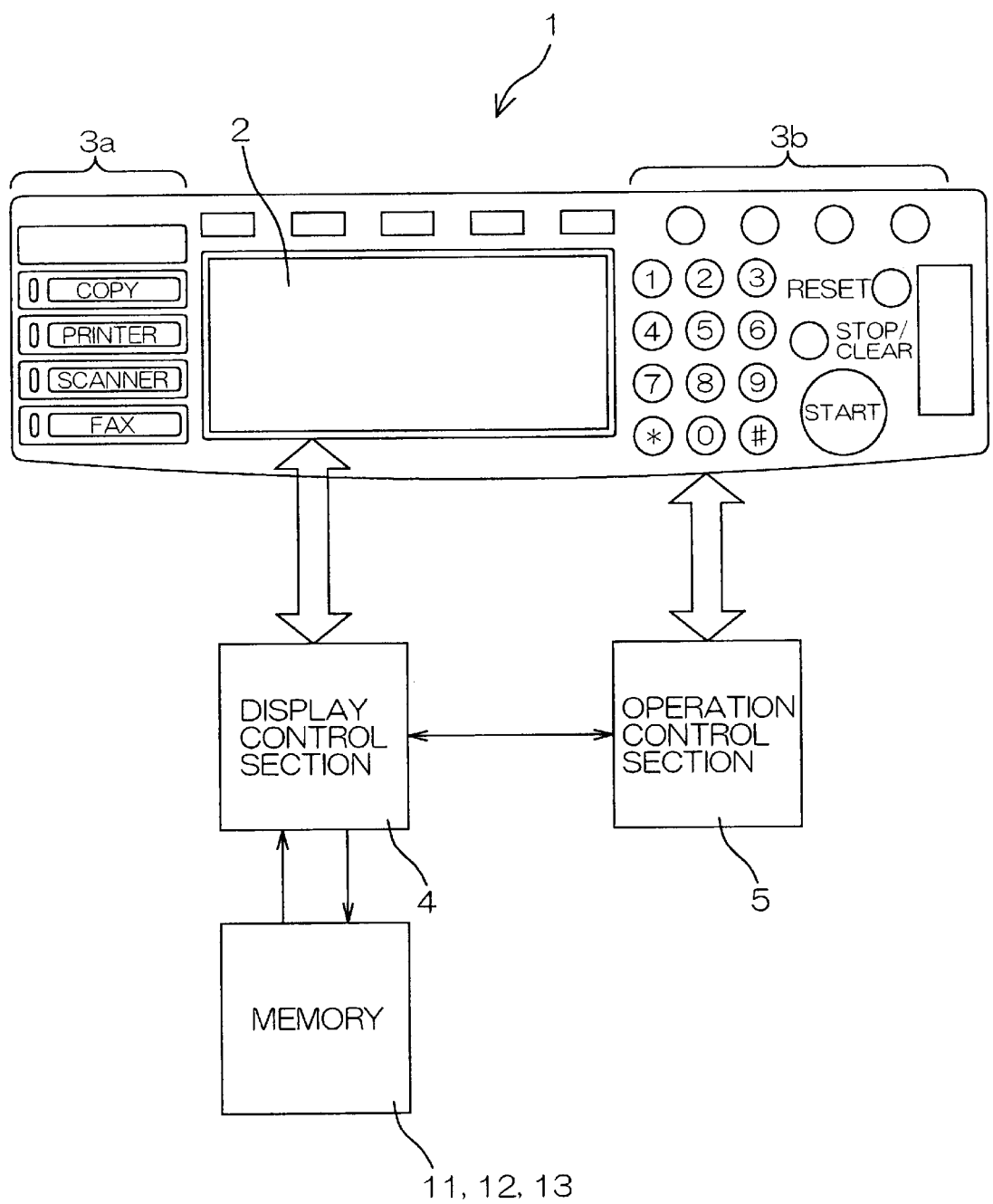
FIG. 1 is a block diagram showing an operation panel and its peripherals provided in an image forming device according to a first embodiment of the present invention.

FIG. 1 is a block diagram showing the operation panel and its peripherals provided in an image forming device according to a first embodiment of the present invention.

The operation panel 1 includes a display screen 2 and a plurality of enter keys 3*a* and 3*b*. The display screen 2 is a so-called touch panel type liquid crystal display panel, which allows the user to enter information by touching keys and buttons displayed on the display screen 2 by hand.

This image forming device has the functions of a copier, a printer, a scanner and a facsimile all together. The user can change over from one function to another by the enter keys 3*a*.

The display screen 2 can display 1st–3rd screens by switching, and various functions whose conditions are to be set are allocated to at least one of the 1st–3rd screens and displayed thereon.

Signals inputted by the enter keys 3a and 3b and the keys and buttons displayed on the display screen 2 are processed by an operation control section 5. A display control section 4 controls display contents of the display screen 2 referring to the contents of memories 11, 12 and 13. The display control section 4 and the operation control section 5 are connected to each other so as to transmit or receive signals according to need.

Each function of the display control section 4 and the operation control section 5 is implemented by execution of a prescribed program performed by a microcomputer incorporated in the image forming device.

Figure 2:
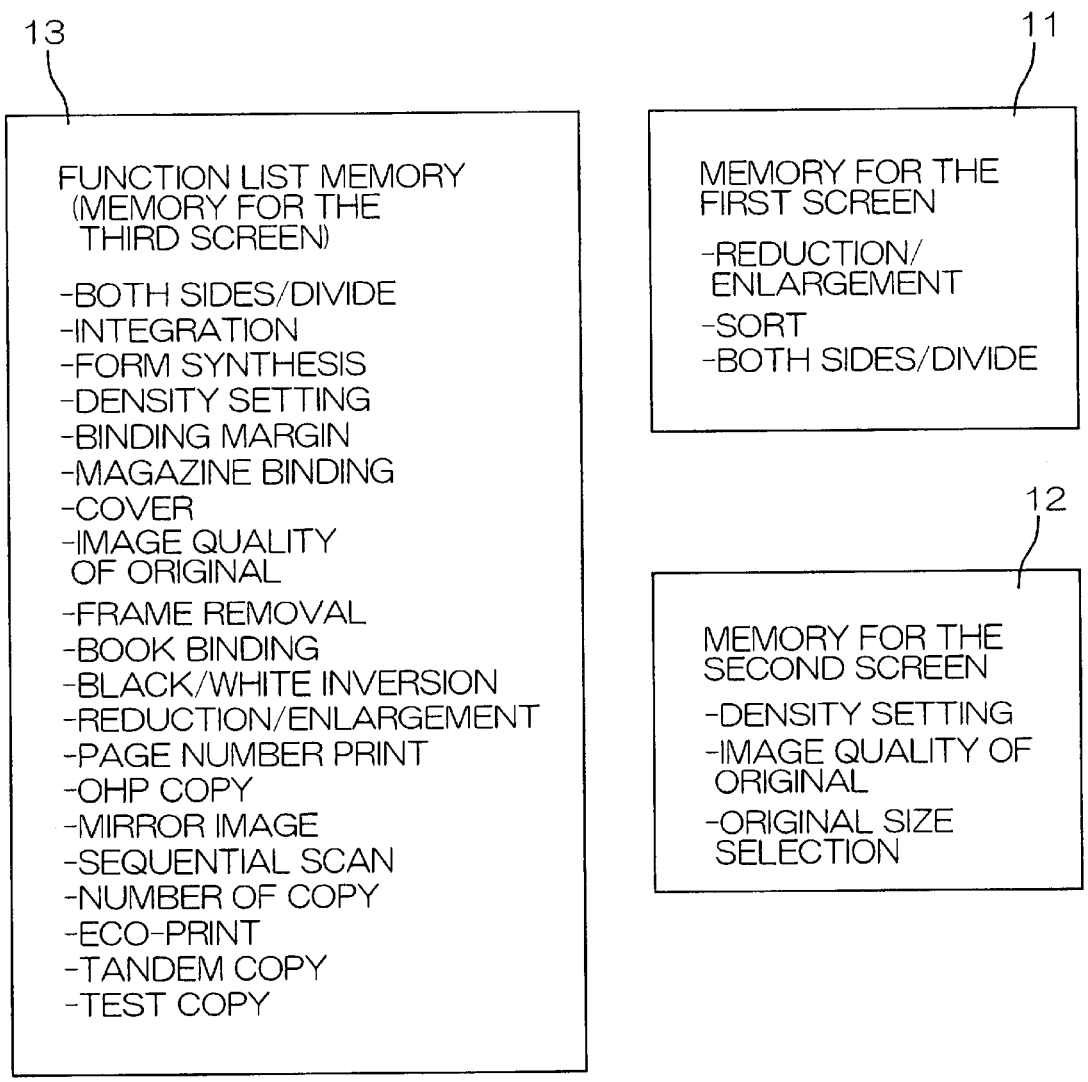
FIG. 2 is a diagram showing the structure of memory storing the relation between functions included in the image forming device and screens for displaying the functions when setting the condition.

FIG. 2 is a diagram showing the structure of memory storing the relation between functions included in the image forming device and screens for displaying the functions when setting the conditions. The following discussion is focused on the functions related to the copying in all functions that the image forming device has.

The display control section 4 has a memory 11 for the first screen, a memory 12 for the second screen, and a function list memory (for the third screen) 13, which correspond to the first screen, the second screen, and the third screen of the display screen 2, respectively. The memory 11 for the first screen stores functions that are to be displayed on the first screen. In FIG. 2, three functions including "Reduction/Enlargement", "Sort", and "Both sides/Divide" are illustrated. These three functions are ones selected by the user. The user can also rewrite these contents.

Similarly, the memory 12 for the second screen stores functions that are to be displayed on the second screen. In FIG. 2, three functions including "Density setting", "Image quality of original" and "Original size selection" are illustrated.

Figure 3:
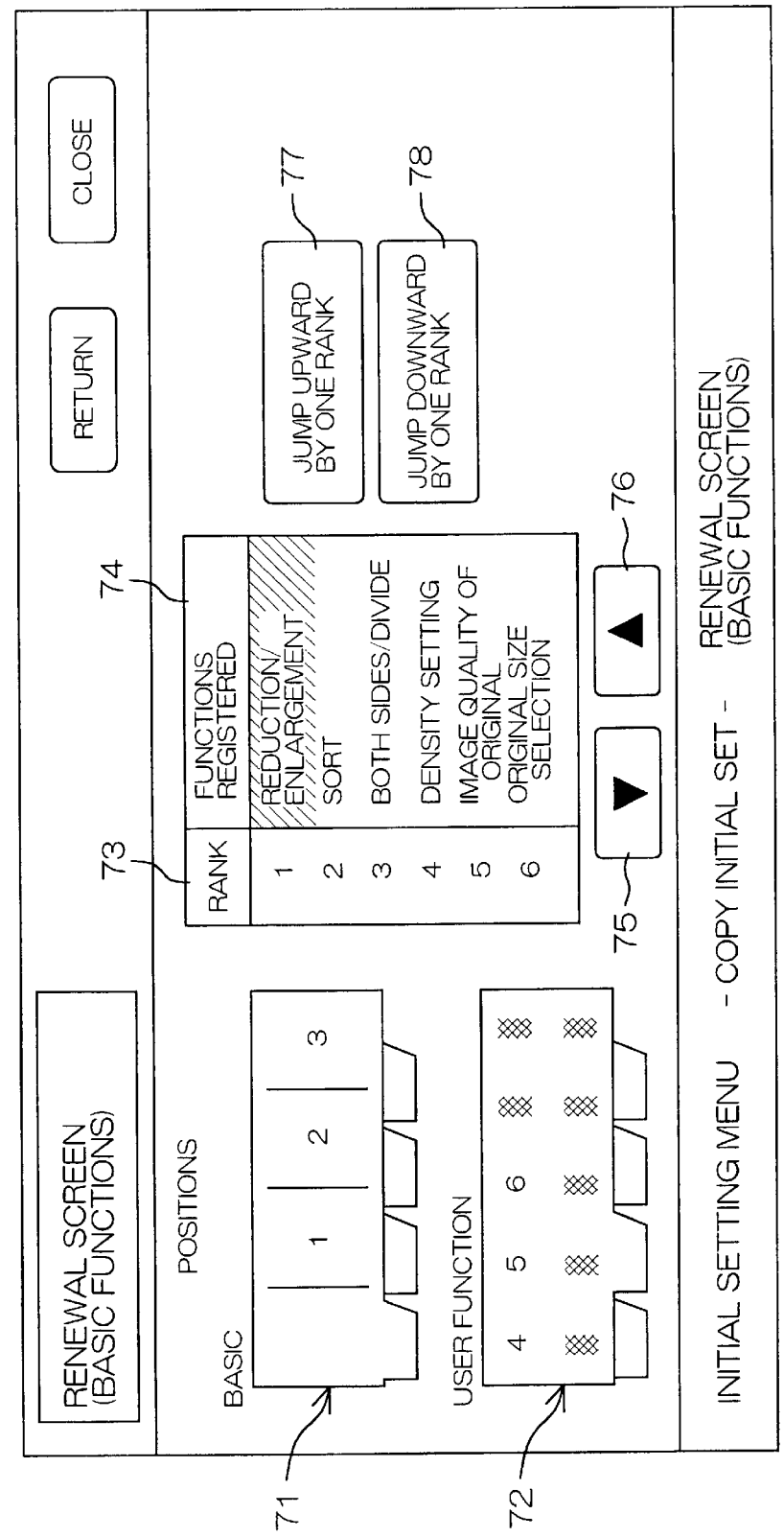
FIG. 3 illustrates a display screen for selecting functions to be displayed in the first and second screens.

Such renewal of the contents can be carried out in a display screen shown in FIG. 3. In the display screen of FIG. 3, functions to be stored in the memory 11 are selected in a basic window 71, and functions to be stored in the memory 12 are selected in a second window 72. The rewriting operation is carried out as follows.

The user touches up-down button 75, 76 so that one of the functions is selected in the FUNCTIONS REGISTERED-window 74. If the user wishes to change the ranking of the selected function, he touches JUMP UPWARD-button 77, or JUMP DOWNWARD-button 78. In this operation, the rank of the selected function can be changed to any other rank.

The selected function of the first rank in the FUNCTIONS REGISTERED-window 74 (i.e. "Reduction/Enlargement" in FIG. 3) is set to the first position of the basic window 71. The selected function of the second rank (i.e. "SORT"in FIG. 3) in the FUNCTIONS REGISTERED-window 74 is set to the second position of the basic window 71. The selected function of the sixth rank (i.e. "ORIGINAL SIZE SELECTION") in FIG. 3 in the FUNCTIONS REGISTERED-WINDOW 74 is set to the sixth position of the second window 72, and so on.

The functions 1 to 3 set in the basic window 71 correspond to the functions stored in the memory 11 for the first screen, while the functions 4 to 6 set in the second window 72 correspond to the functions stored in the memory 12 for the second screen (see FIG. 2).

The above six functions are called basic functions, which are preliminarily selected as functions expected to be frequently used from among all the functions.

All the functions are stored in the function list memory 13 (for the third screen). These are fixed contents of the function list memory 13.

Figure 4:
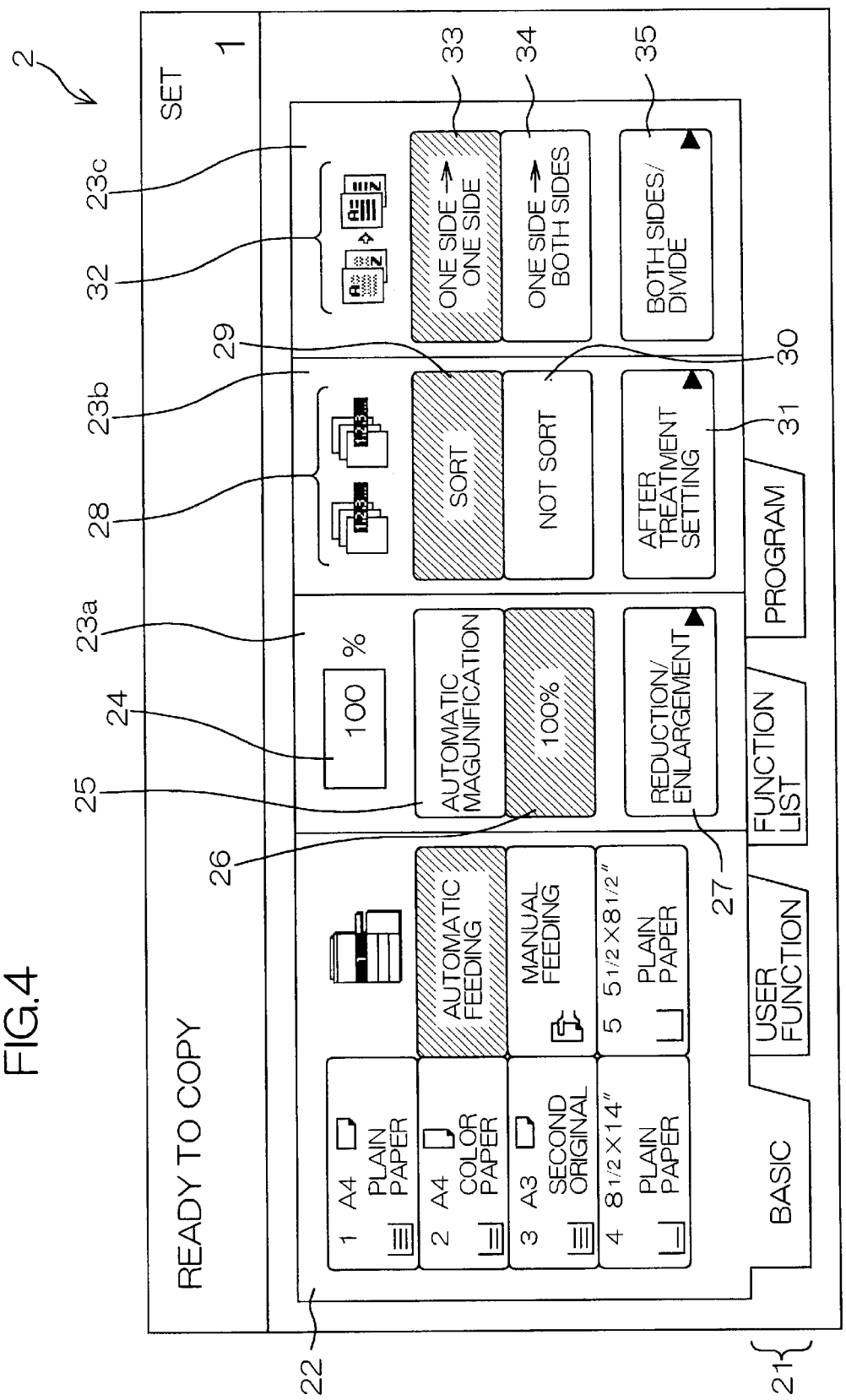
FIG. 4 illustrates the contents of a first screen in which basic functions selected by the user are laid out.

FIG. 4 illustrates the contents of the first screen (basic screen).

A plurality of tabs 21 for switching the screen are located at the lower part of the display screen 2. By touching these tabs, the user can switch the screen to the first screen (basic screen), the second screen(user function screen), the third screen (function list screen) or a screen other than these (program screen) The first screen includes on its left side a copy paper selection display 22 covering about ⅖ of the whole screen. The other part on the right covering ⅗ of the whole screen is laterally divided into three areas that form three condition setting display areas, which are from left to right, 23a, 23b and 23c.

Display modes including "Reduction/Enlargement", "Sort" and "Both sides/Divide" functions have been selected from the basic functions and each of them is displayed on the condition setting display areas 23a, 23b and 23c, respectively.

In the condition setting display for "Reduction/Enlargement" (the condition setting display area 23a), there are disposed in descending order, a magnification display region 24 for displaying the current magnification, an automatic magnification selection button 25 for automatically setting magnification, a direct magnification designating button 26 for carrying out copying at a prescribed magnification, and a jump button 27 for jumping to a screen for carrying out reduction/enlargement setting.

In the condition setting display for "Sort" (condition setting screen display area 23b), there are disposed in descending order a picture display 28 which visually indicates the current setting, sort or non-sort, a sort selection button 29 for sorted ejection, a non-sort selection button 30 for ejection without sorting, and a jump button 31 for jumping to a condition setting screen for after treatment, which is used when paper after copying is subjected to after treatment.

In the condition setting display for "Bothsides/Divide" (the condition setting display area 23c), there are disposed in descending order a picture display 32 visually indicating the currently selected setting, "one side→one side" or "one side→both sides", a "one side→one side" setting button 33 for copying one side of the original onto one side of the copy paper, a "one side→both sides" setting button 34 for copying one side of the original onto both sides of the copy paper, and a jump button 35 for jumping to a condition setting screen regarding "Both sides/Divide".

The select buttons 25, 26, 29, 30, 33, 34 are touched so as to enable their respective functions and settings. The select buttons 26, 29 and 33 corresponding to the enabled functions and settings have characters displayed being inverted (In FIG. 3 and other Figures, inverted displays are shown by hatching for convenience) so that the current settings can be visually confirmed.

Figure 5:
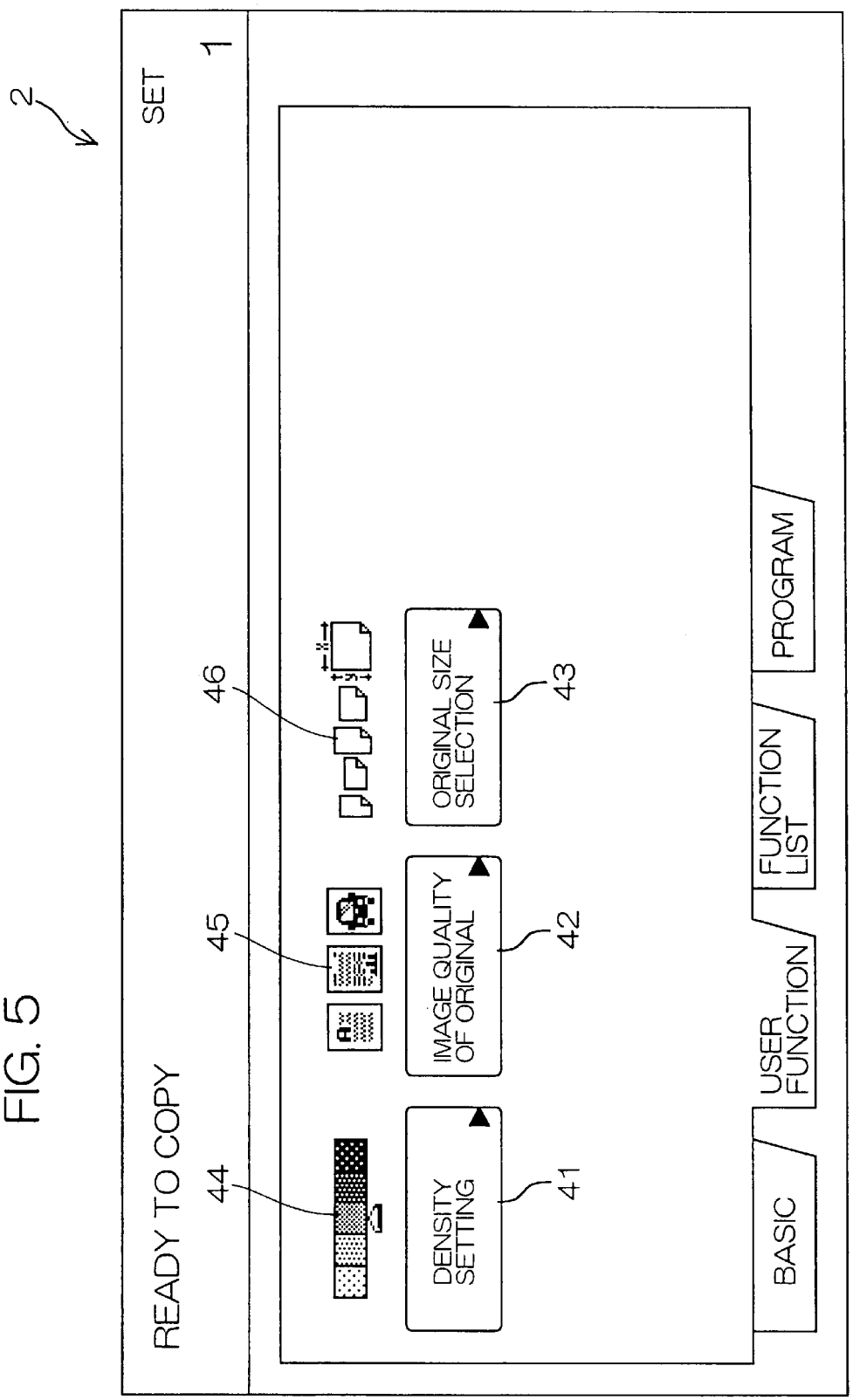
FIG. 5 illustrates the contents of a second screen in which functions that have not been selected by the user are laid out.

FIG. 5 illustrates the contents of the second screen (User function screen) in which basic functions that have not been selected by the user are laid out. Here, "Density setting", "Image quality of the original" and "Original size selection" are laid out as the basic functions not selected by the user.

In the upper left area of the screen, there are disposed jump buttons 41, 42, and 43 for jumping to condition setting screens regarding the three basic functions that have not been selected for the first screen, and picture displays 44, 45, and 46 which visually indicate the contents of the functions. By touching the jump button 41, 42 or 43, the user can jump to the condition setting screen for the corresponding function and set its condition.

Since the basic functions that have not been selected for the first screen are automatically allocated to this second screen, the user does not have to allocate them to the second screen on his or her own.

Figure 6:
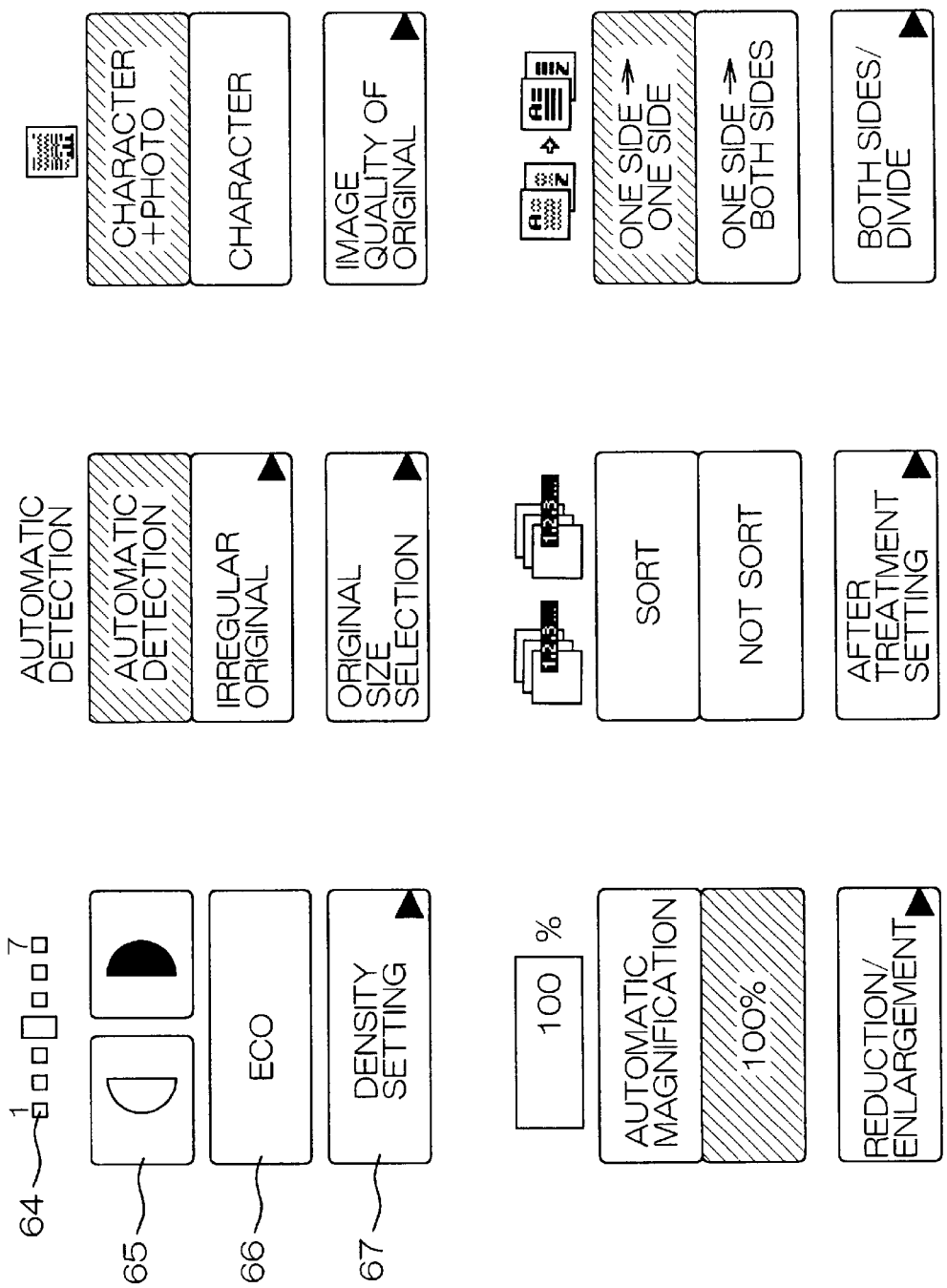
FIG. 6 illustrates display modes of six basic functions.

An example in which jump buttons for jumping to condition setting screens are laid out in the second screen has been discussed above. However, it is also possible to display select buttons together with the jump buttons as shown in FIG. 6. In such a case, the displayed select buttons allows the user to make basic settings without switching to another screen.

FIG. 6 illustrates a full list of display modes of the six basic functions.

Figure 7:
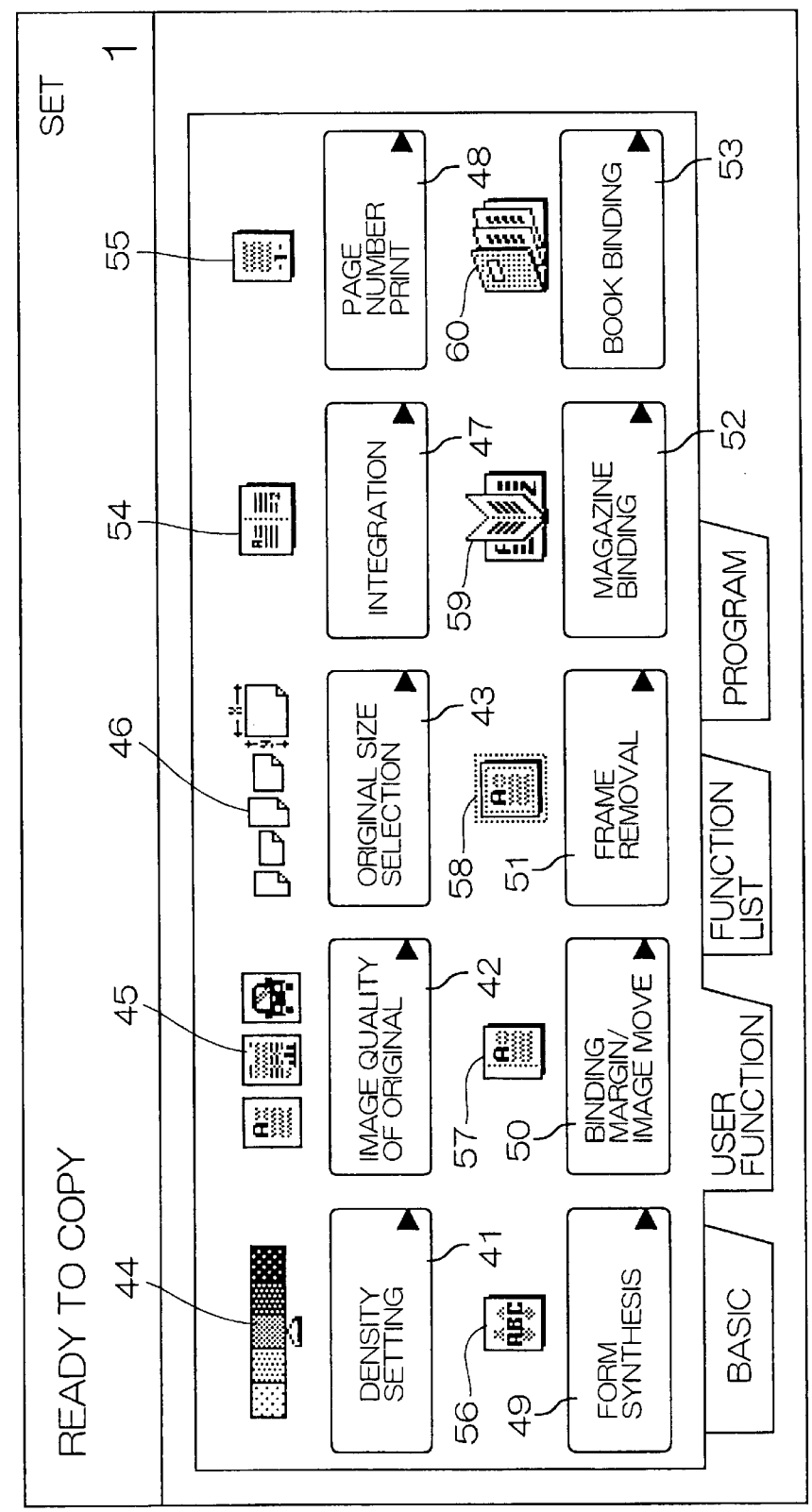
FIG. 7 illustrates the contents of the second screen in which other functions are added to those in FIG. 4.

FIG. 7 shows a modified display mode of the second screen (user function screen) in which other functions are added to those in FIG. 5.

The "other functions" above refers to functions that are not included in the predetermined six basic functions. In accordance with the width of the screen, an appropriate number (up to 7 in this embodiment) of other functions can be laid out.

In this second screen, jump buttons 47–53 and picture displays 54–60 for other functions are disposed in the area where the jump buttons 41–43 and the picture displays 44–46 for the basic functions are not disposed.

Figure 8:
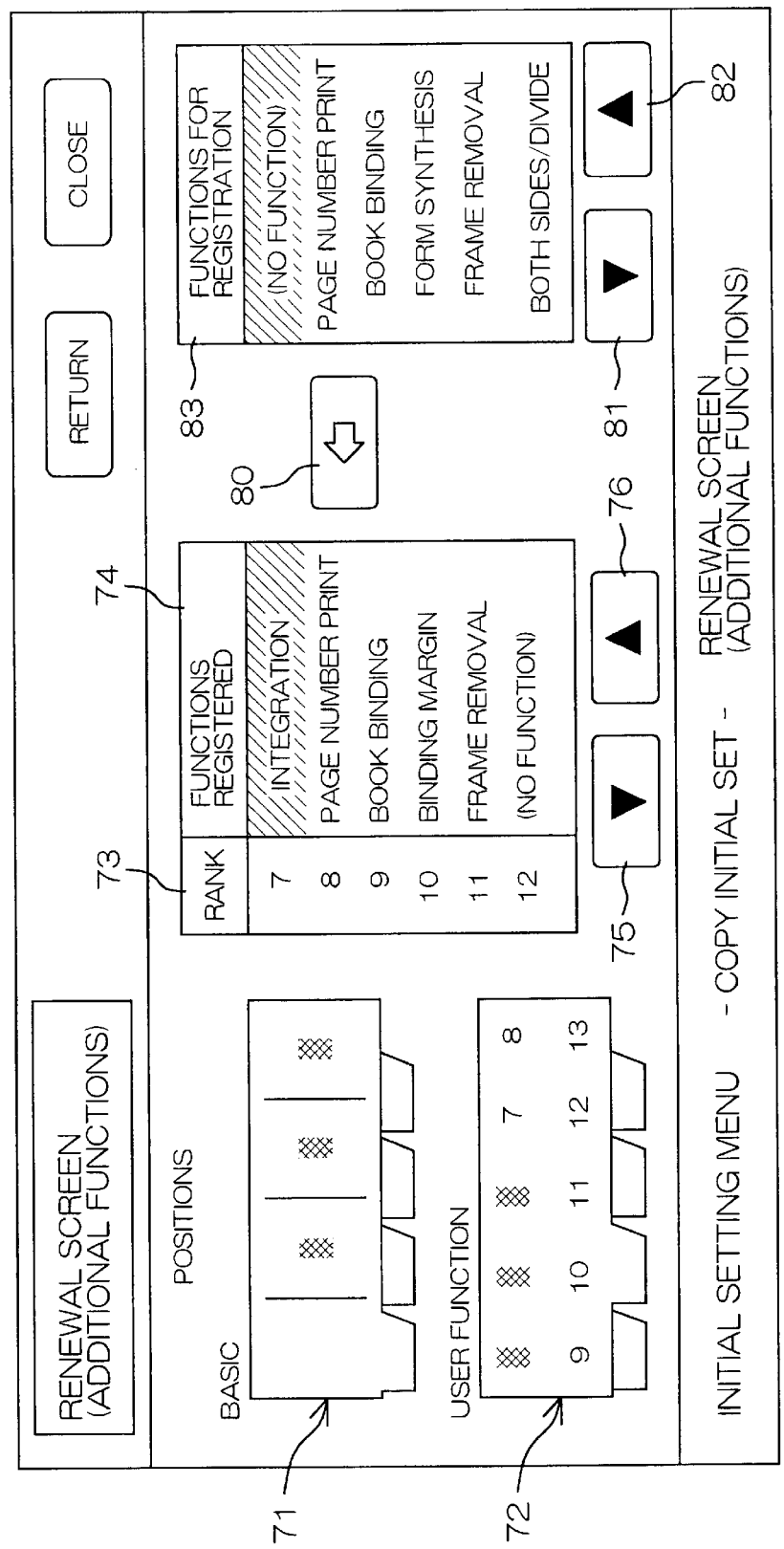
FIG. 8 illustrates a display screen for selecting "other functions" to be displayed in the second screen.

The user can arbitrarily select functions from among the "other functions" and allocate them to the screen. FIG. 8 shows how to select the "other functions" from all the other functions. In the display screen of FIG. 8, seven functions selected are listed on ranks 7 to 13 in the second window 72. FUNCTIONS FOR REGISTRATION-window 83 includes all the other functions stored in the memory 13. The selection operation of these seven functions is carried out as follows.

The user selects one function in the FUNCTION REGISTERED-window 74, and selects one function in the "FUNCTIONS FOR REGISTRATION-window 83". He touches move button 80, then the selected function in the window 83 substitutes the selected function in the window 74.

With this operation, any desired functions can be selected in the FUNCTION REGISTERED-window 74. The selected functions are set to the seventh to thirteenth positions in the second window 72. Here, seven functions are selected, which are "Integration", "Page number print", "Form synthesis", "Binding margin/Image move", "Frame removal", "Magazine binding", and "Bookbinding." By touching the jump buttons 47–53, the user can jump to the condition setting screens for the respective functions.

Figure 9:
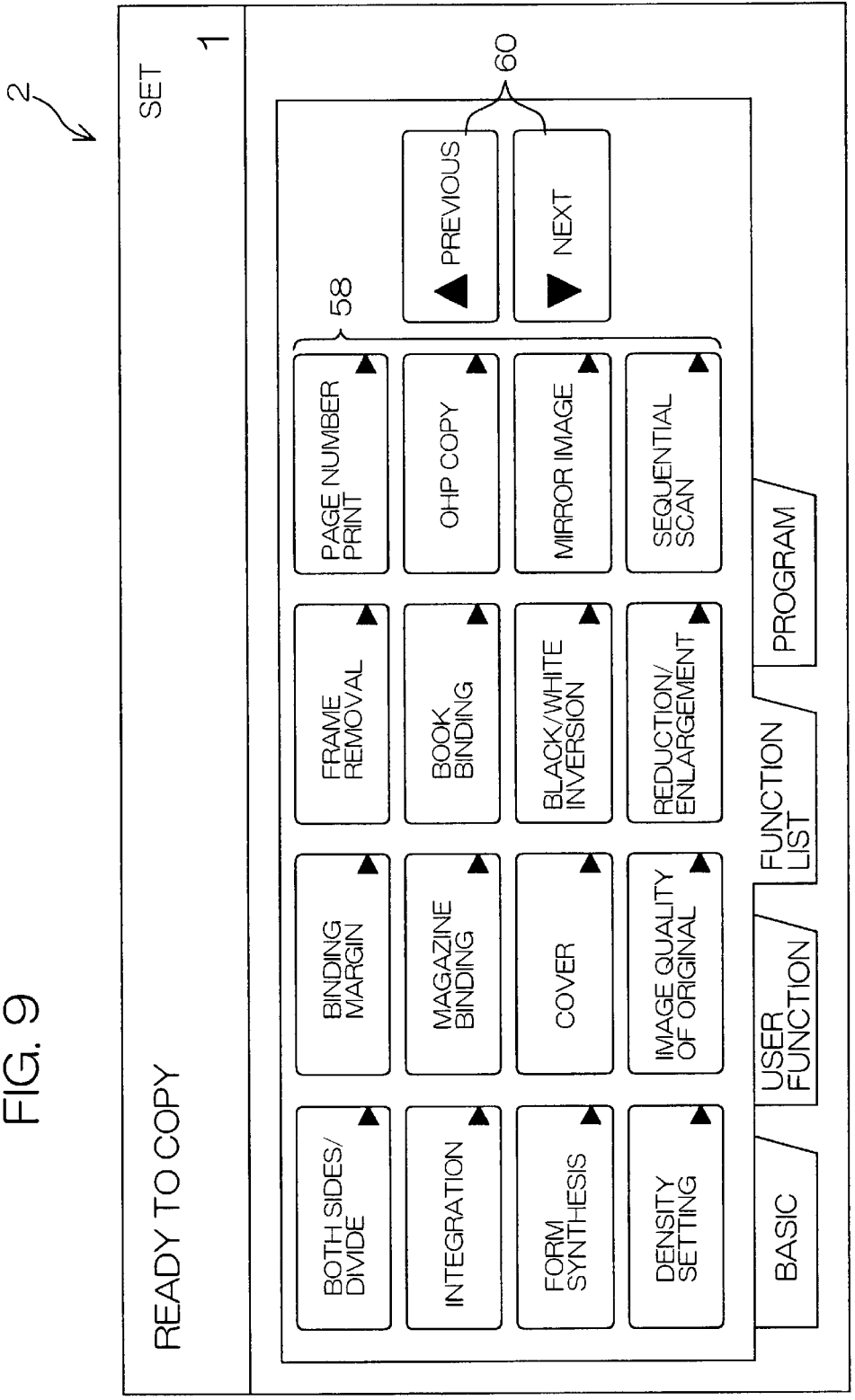
FIG. 9 illustrates the contents of a third screen (first page).
Figure 10:
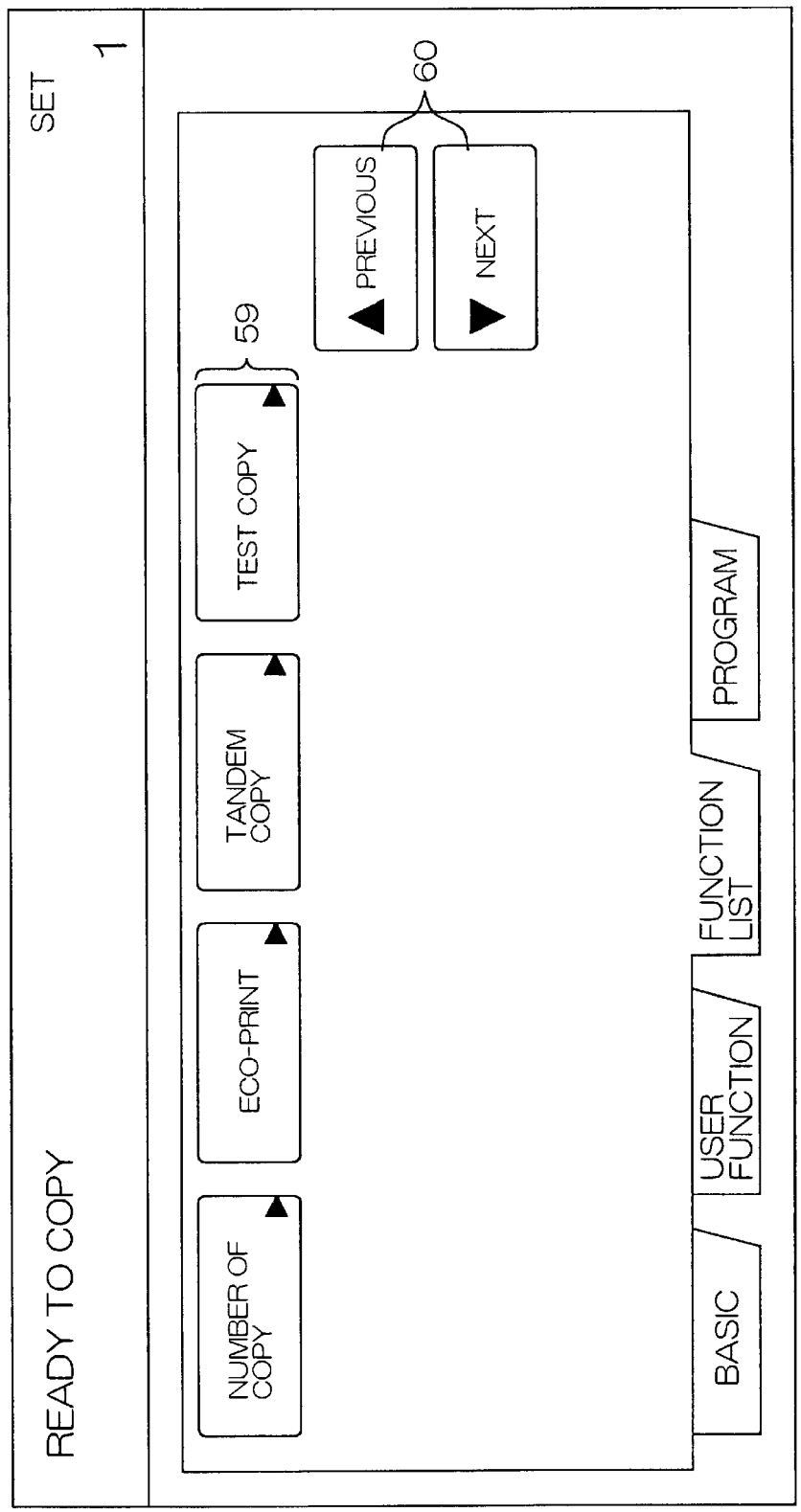
FIG. 10 illustrates the contents of the third screen (second page).

FIGS. 9 and 10 illustrate the contents of the third screen (function list screen).

The third screen includes two pages. These pages can display jump buttons for jumping to the condition setting screens for the respective functions such that they are arranged in four rows both vertically and horizontally. This image forming device has 20 functions. Jump buttons 58 for the first 16 functions are displayed on the first page (FIG. 9) of the third screen, and jump buttons 59 for the remaining 4 functions are displayed on the second page (FIG. 10). By touching the jump buttons 58 and 59, the user can jump to the condition setting screens of the respective functions and carry out condition setting. Both of the pages include page shift keys 60 on the right side of the screen for changing the page to be displayed.

As discussed so far, by the image forming device according to the present invention, basic functions that are generally often used can be displayed such that they are allocated to the first screen and the second screen according to the users preference. In addition, functions other than the basic functions can be allocated to the second screen.

Accordingly, the most frequently used functions can be displayed on the first screen, and the main settings thereof can be made within the first screen. The second most frequently used functions can be displayed on the second screen all together. Functions that have relatively low frequency of use can be searched on the third screen and used.

As is described above, the image forming device according to the present invention is capable of clearly displaying the functions to be set according to need arising for image forming operation, and the contents to be displayed can be modified according to the user's preference. It is therefore user-friendly and has good operationality.

2. Second Embodiment

A second embodiment of this invention is now described. Similarly to the first embodiment, the display screen 2 of this embodiment also has the 1st–3rd screens.

Figure 11:
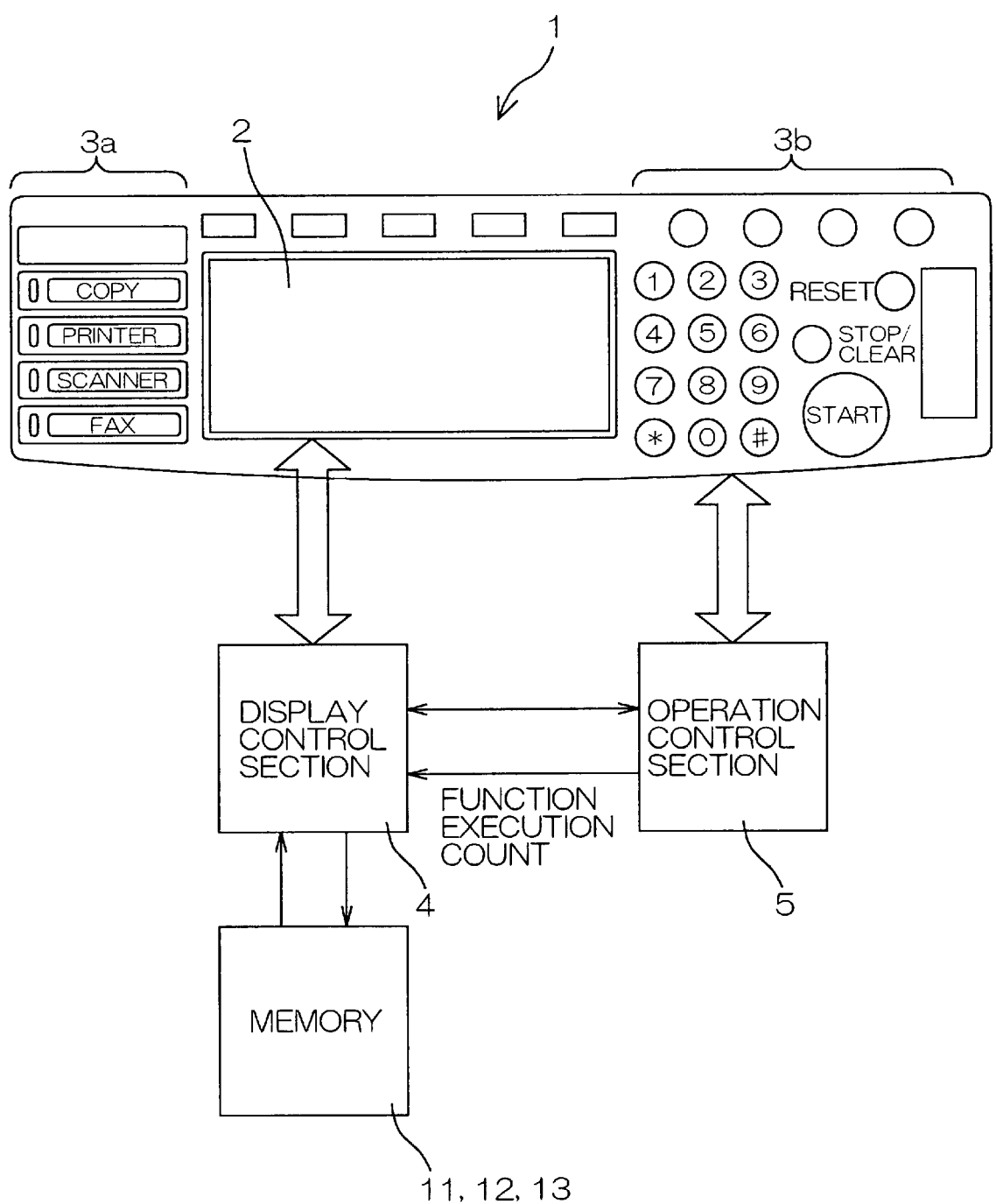
FIG. 11 is a block diagram showing the display panel and its peripherals provided in an image forming device according to a second embodiment of the present invention.

FIG. 11 is a block diagram showing an operation panel 1 and its peripherals provided in the image forming device according to the second embodiment of this invention.

What is different from the first embodiment is that function execution counts are inputted from the operation control section 5 into the display control section 4 and arithmetically processed in the display control section 4 according to algorism mentioned later so that the display contents of the first and second screens are varied based on the results of the calculation.

Figure 12:
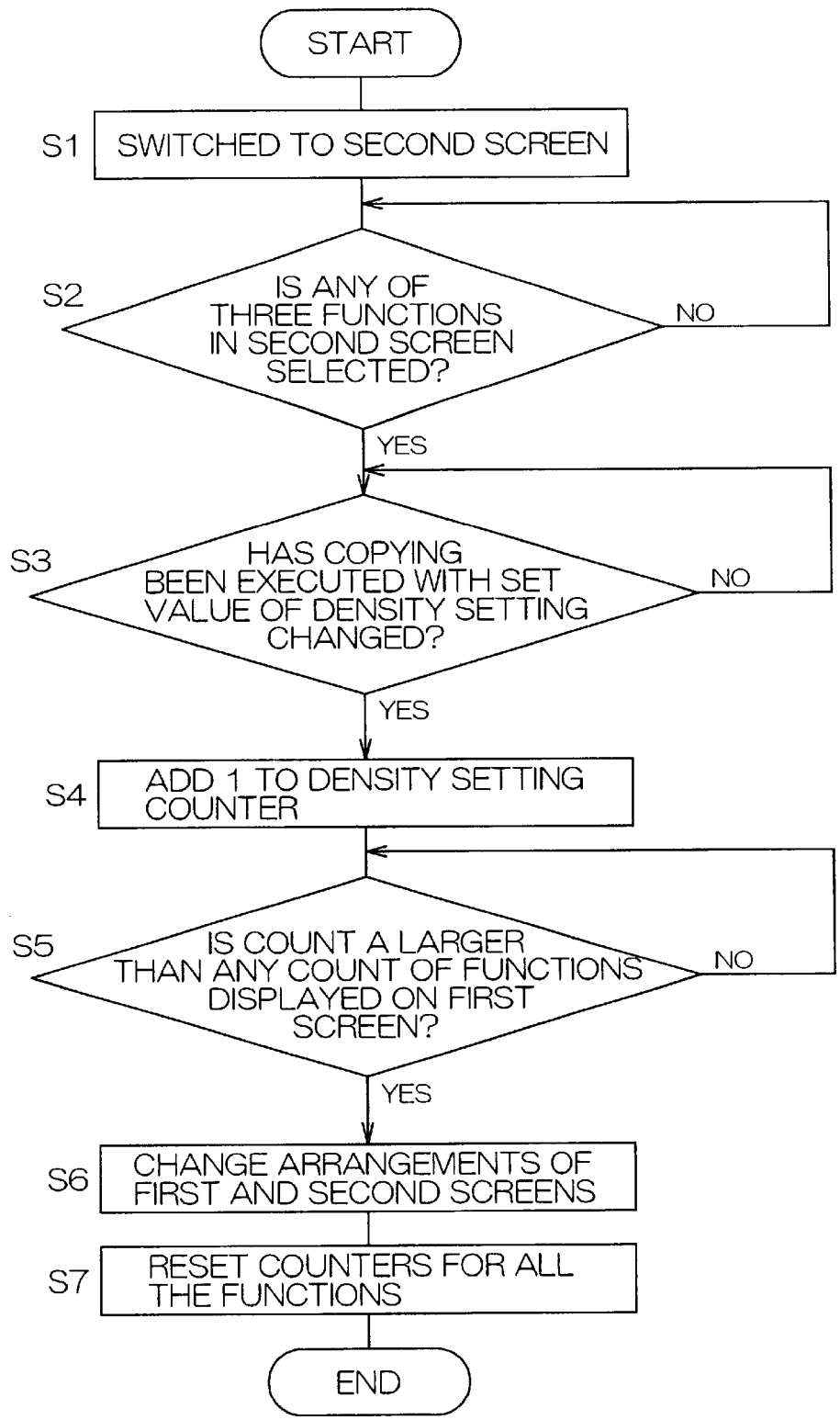
FIG. 12 is a flowchart showing a flow for controlling display contents of a display screen 2.

FIG. 12 is a flowchart showing a flow for changing the display contents of the display screen 2 (that is, the contents stored in the memory 11 for the first screen and the memory 12 for the second screen) of the image forming device. In this algorism, a case where the location of the "Density setting" is changed from the memory 12 for the second screen to the memory 11 for the first screen is illustrated. Changing the locations of other functions displayed on the second screen is also possible.

When the display screen 2 is switched to the second screen (Step S1), the processing is held until one of the three functions displayed on the second screen (FIG. 5) is selected (Step S2). At this stage, it is also possible not to carry out operation concerning the second screen, and instead, to carry out a cut-in processing such as switching the screen to the first screen. In such a case, the flow is cut off.

When it is determined "YES" in the step S2, the processing waits until the set value (density) of the "Density setting" is changed (Step 3). At this stage, it is also possible to carry out a cut-in processing such as varying the set value of another function displayed on the second screen, and in such a case, the flow is cut off. When the set value is varied and copying is carried out (in the case of "YES" in the step S3), the density varying counter A (Step S4) is added by one, that is, A is substituted with A+1. By this step, the number of times the density has been varied along with execution of copying is counted up.

Although not shown in FIG. 12, when set values are varied and copying is carried out regarding other functions displayed on the second screen and functions displayed on the first screen, the counters for the respective functions are counted up as well in appropriate timing similarly to the above case.

Only the six basic functions are provided with counters.

Subsequently, whether the count value A of the "Density setting" is larger than the count values of the three functions displayed on the first screen or not is judged (Step S5). The judgment is made based on a predetermined criterion. For example, A is compared with the largest count value in the count values of the three functions displayed on the first screen. Or, it is compared with the second largest count value in the same, or with the smallest count value in the same. Any criterion that fits for the purpose can be adopted.

Meanwhile, it is also possible to make the judgment at this step S5 only when the count A exceeds a prescribed minimum count value (for instance, 100). This is because there may be cases where the counts are small such as when it is shortly after the purchase of the image forming device, and in such cases, the locations of the functions displayed on the screen frequently change making the operation even harder.

When the count A of the "Density setting" is larger than one of the count values of the functions displayed on the first screen, the arrangements of the functions displayed on the first screen and the second screen are changed (Step S6). The function of the "Density setting" is allocated to an appropriate area in the first screen, which is one of the condition setting display areas 23a, 23b and 23c. Simultaneously, the function with the smallest count value that has been displayed on the first screen is allocated to an appropriate area in the second screen. Such variations in arrangement are accomplished by rewriting the contents of the memory 11 for the first screen and the memory 12 for the second screen shown in FIG. 2.

Finally, the counters for all the functions are reset (Step S7). Unless they are reset, the values of the counters simply keep increasing so that the functions are unlikely to be rearranged according to the most recent record of usage. In order to achieve the same effect without resetting the counts, it is possible to judge whether rearrangement is to be carried out or not (Step S5) by using the counts of the counters resulted from a prescribed number of times (for instance, 100 times) of counting carried out most recently or counts that have accumulated during a most recent prescribed time period (for instance, within a month).

By this method of controlling the display contents of the display screen 2, frequently used functions are automatically displayed on the first screen. Accordingly, the user does not need to change displayed contents by himself (herself) for his (her) convenience even when the frequently used functions change.

In addition, since functions that can be displayed on the first and second screens are limited to the six basic functions, it is easy to find out a function that the user wishes to set even immediately after the arrangement of displayed functions has been varied.

When the function of "Density setting" is allocated to the first screen, the display mode of the "Density setting" is the one shown in the upper left of FIG. 5. That is, a density display area 64 indicating the current density, a density setting button 65 for setting the density by hand, ECO button 66 for saving toner, and a jump button 67 for jumping to a screen for detailed setting of the density are arranged in descending order.

3. Third Embodiment

A third embodiment of the present invention is now described. Similarly to the first and second embodiments, the display screen 2 of this embodiment also has the 1st–3rd screens.

According to the third embodiment, set values for specific items of specific functions allocated to direct set-value designating buttons are changed into set values that have been most frequently designated.

The "set value" is hereinafter explained taking the magnification of the "Reduction/Enlargement" as an example.

Figure 13:
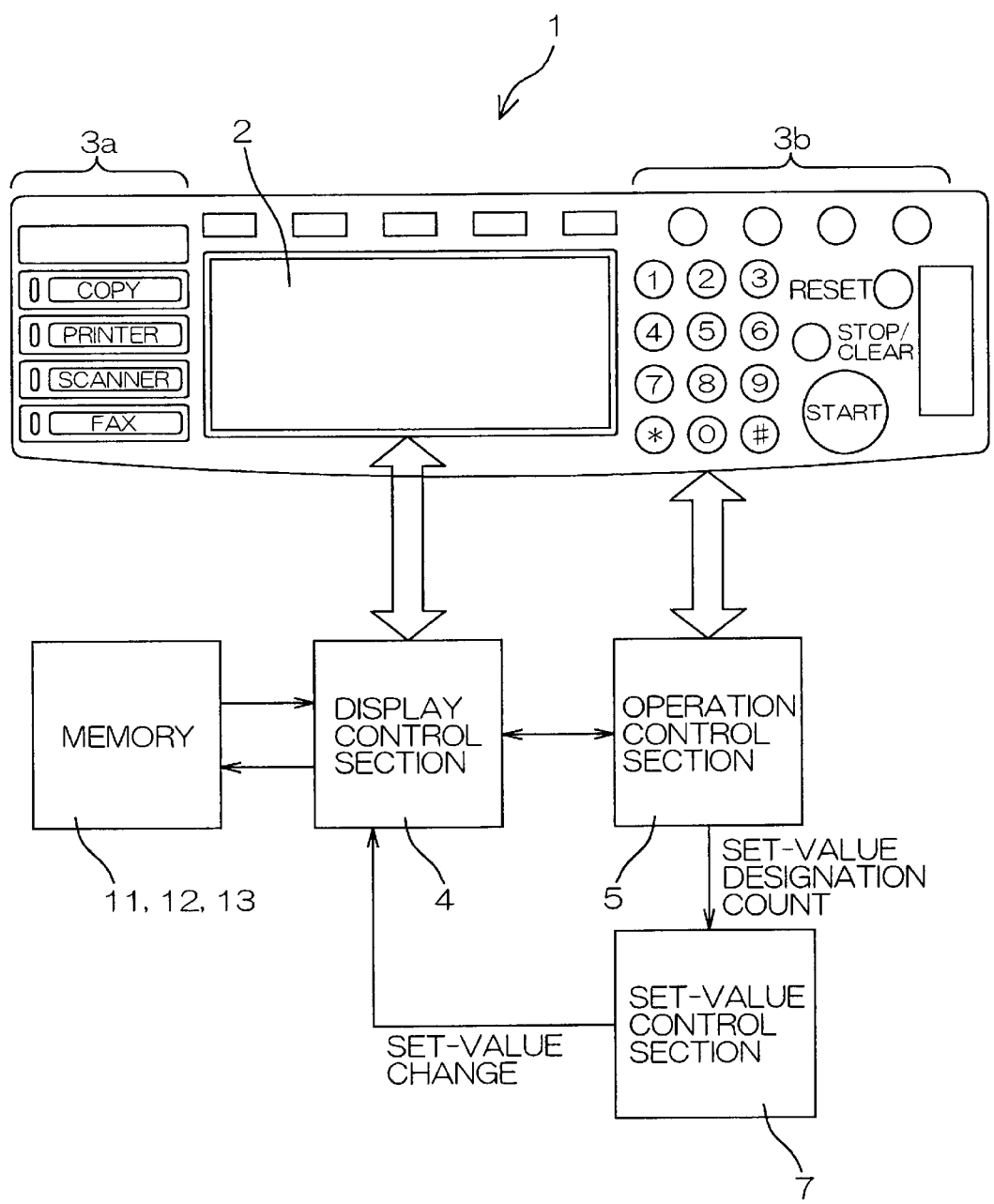
FIG. 13 is a block diagram showing the display panel and its peripherals provided in an image forming device according to a third embodiment of the present invention.

FIG. 13 is a block diagram showing the display panel and its peripherals provided in an image forming device according to the third embodiment of the present invention.

What is different from the block diagram in FIG. 1 is that this embodiment has a set value control section 7 into which set value designation counts are inputted from the operation control section 5, and the counts are arithmetically processed according to algorism mentioned later so that set values to be allocated to the direct set-value designating buttons become variable according to the results of the calculation.

Figure 14:
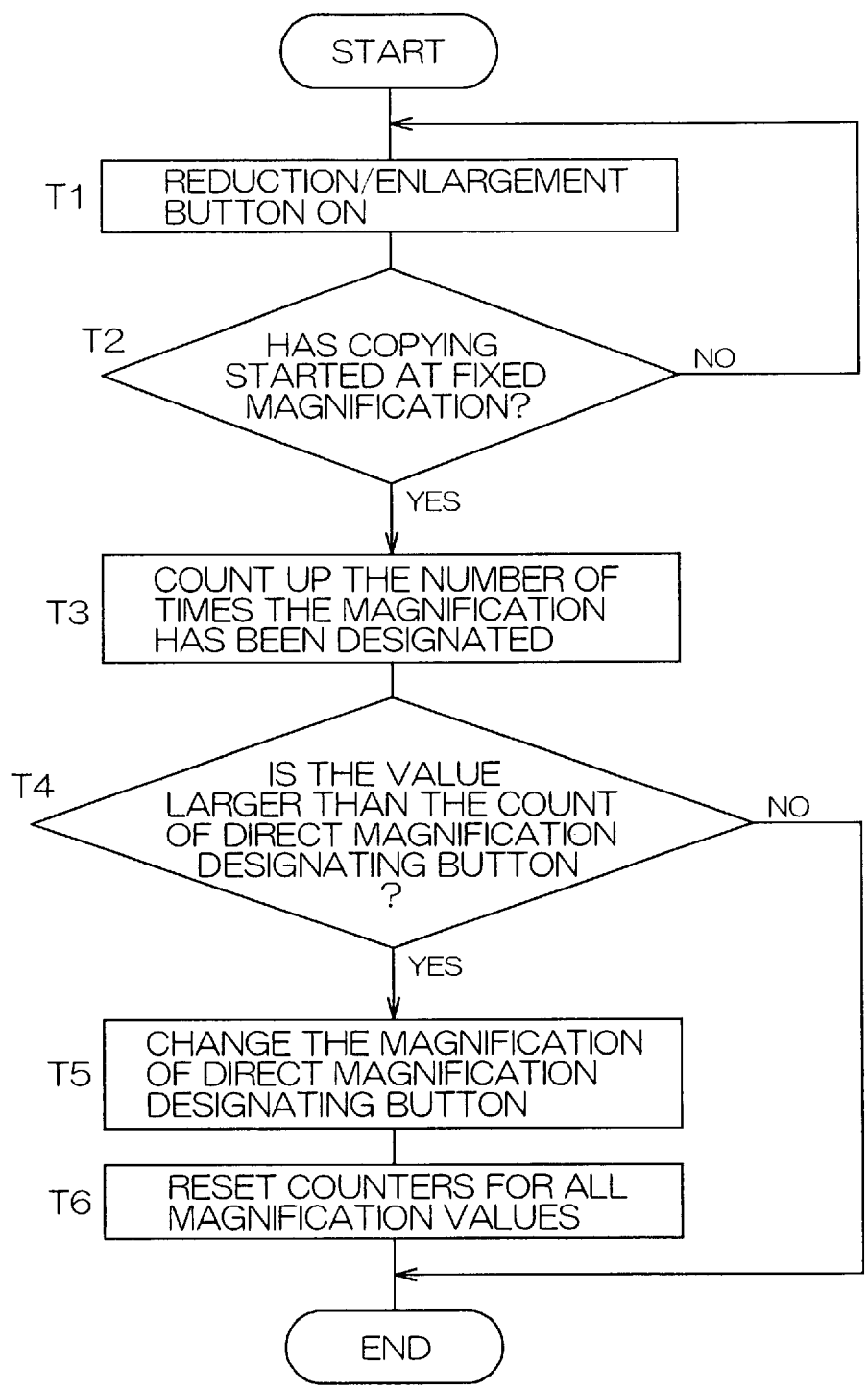
FIG. 14 is a flowchart showing a flow for controlling set value of magnification allocated to a direct magnification designating button 26 displayed on the display screen 2.

FIG. 14 is a flowchart showing a flow for varying the set value of magnification allocated to a direct magnification designating button 26 displayed on the display screen 1 of the image forming device.

First, a button for setting "Reduction/Enlargement" (for example, the jump button 27 for jumping to a screen for detailed setting) is turned ON (Step T1).

Here, whether the designated magnification is an automatic magnification value or a fixed magnification value is checked (Step T2), and in the case of the automatic magnification, steps after this are not carried out.

When copying is started at a fixed magnification set as a default or when copying is started at a fixed magnification set by the fixed magnification key (in the case of YES in the step T2), the number of times the magnification has been designated is counted up (Step T3), by which, for example, how many times a magnification of 70% has been designated or how many times a magnification of 90% has been designated is counted.

Subsequently, whether the count value of the magnification that has been counted up is larger than the count value of the magnification allocated to the direct magnification designating button 26 or not is determined (Step T4). Here, it is assumed that the magnification that has been counted up is different from the magnification allocated to the direct magnification designating button. It is also possible to make this judgment only when the count value exceeds a prescribed minimum count value (for example, 100). This is because there may be cases where the counts are small such as when it is shortly after the purchase of the image forming device, and in such cases, the set value of magnification to be allocated to the direct magnification designating button 26 changes so frequently that the operation becomes even harder.

When the count value of magnification that has been counted up is larger, the larger magnification value is allocated to the direct magnification designating button 26 (Step T5). Then, the counters for all the set values are reset. Unless they are reset, the values of the counters simply keep increasing so that the set values are unlikely to be varied according to the most recent record of usage. In order to achieve the same effect without resetting the counters, it is possible to judge whether variation of the set value is to be carried out or not (Step T4) by using counts of the counters resulted from a prescribed number of times (for instance, 100 times) of counting carried out most recently or counts that have accumulated during a most recent prescribed time period (for instance, within a month).

When the count value that has been counted up immediately before is not larger in the step T4 (in the case of NO in the step T4), the processing is completed.

Although not all the functions have such a "direct set-value designating button" as the direct magnification designating button 26, as far as functions that have direct set-value designating buttons are concerned, it is possible to directly designate frequently used set values without switching screens according to the third embodiment of the present invention.

What is claimed is:

1. An image forming device comprising:
 a display section for displaying a plurality of functions that can be set according to need arising in image forming operation, the display section being capable of switching at least between a first screen and a second screen;

function selecting means for selecting at least one desired function to be displayed in the first screen from among the plurality of functions; and display control means for making the first screen display a function thus selected from among the plurality of functions and making the second screen display a function included in the plurality of functions that has not been selected, whereby any function displayed in the first screen or the second screen can be selected by a user for image forming operation.

2. The image forming device according to claim 1, wherein the plurality of functions are divided into a plurality of predetermined basic functions with high frequency of use and functions other than the basic functions, and the display control means make the first screen display a function selected from among the basic functions, and make the second screen display a function included in the basic functions that has not been selected.

3. The image forming device according to claim 2, wherein the display control means make the second screen display a function other than the basic functions in addition to the function included in the basic functions that has not been selected.

4. The image forming device according to claim 2, wherein the display section is capable of further switching to a third screen, and the display control means make the third screen display all the functions.

5. An image forming device comprising:

a display section for displaying a plurality of functions that can be set according to need arising in image forming operation, the display section being capable of switching at least between a first screen and a second screen;

function execution counting means for counting the number of times that each of the plurality of functions is executed along with execution of the image forming operation; and display control means for making the first screen display a frequently used function, which is determined based on the count of each of the functions that has been counted by the function execution counting means, and making the second screen or another screen thereafter display a function that has not been selected for the first screen.

6. The image forming device according to claim 5, wherein the plurality of functions are divided into a plurality of predetermined basic functions with high frequency of use and functions other than the basic functions, and the function execution counting means count the number of times that the basic functions are executed.

7. The image forming device according to claim 5, wherein the display control means make the first screen display a frequently used function on condition that the count of the function counted by the function execution counting means exceeds a prescribed minimum count value, and make the second screen or another screen thereafter display a function that has not been selected for the first screen.

8. The image forming device according to claim 5, wherein the function execution counting means reset the count after the display control means make the first screen display a frequently used function.

9. An image forming device comprising:

a display section for displaying a direct set-value designating button for designating a set value which is previously allocated to a specific item of a specific function according to need arising in image forming operation;

set-value designation counting means for counting the number of times that the image forming operation is executed with the set value being designated by the direct set-value designating button; and set-value control means for varying the set value to be allocated to the direct set-value designating button based on the number of times counted with the set value being designated.

10. The image forming device according to claim 9, wherein the set-value control means vary the set value to be allocated to the direct set-value designating button on condition that the count counted by the set-value designation counting means exceeds a prescribed minimum count value.

11. The image forming device according to claim 9, wherein the set-value designation counting means reset the count after the set-value control means vary the set value to be allocated to the direct set-value designating button.

* * * * *